Oct. 20, 1964                J. W. RYAN                3,153,364
                          TOY MUSICAL INSTRUMENT
                          Filed May 21, 1962
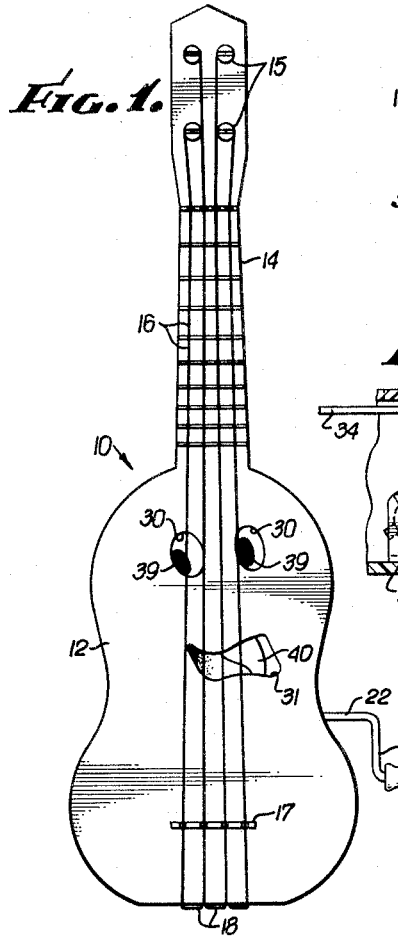
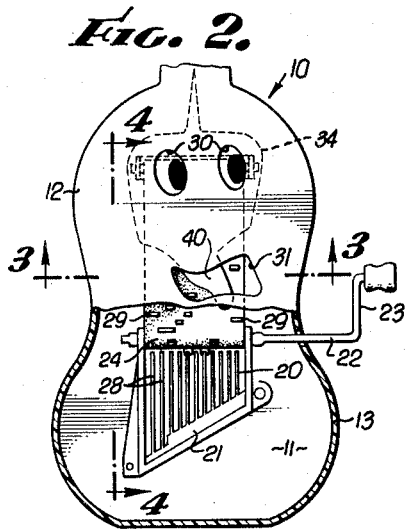
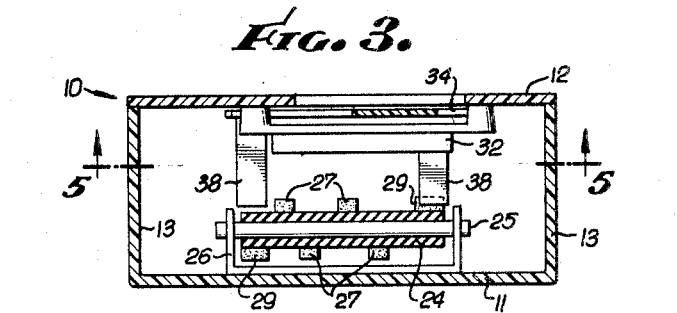
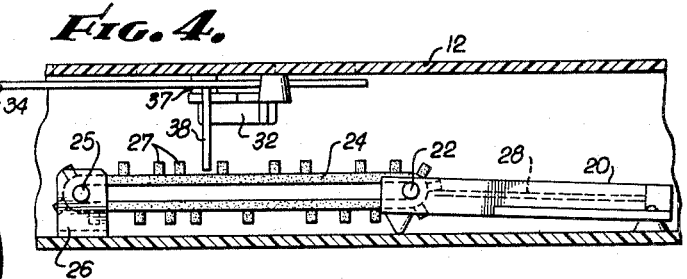
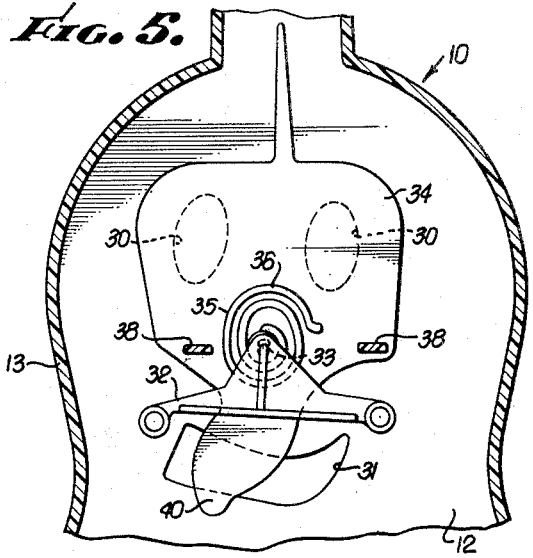
INVENTOR.
JOHN W. RYAN
BY Albert M. Herzig
ATTORNEY.

United States Patent Office 3,153,364
Patented Oct. 20, 1964

3,153,364
TOY MUSICAL INSTRUMENT
John W. Ryan, Bel-Air, Calif., assignor to Mattel, Inc., Hawthorne, Calif., a corporation of California
Filed May 21, 1962, Ser. No. 196,226
11 Claims. (Cl. 84—94)

This invention relates to musical toys and more especially to such toys having animatable features actuated during the playing of a musical tune.

Children's stories and nursery rhymes of many types can often be taught in association with a musical accompaniment or counterpart so that the story told or sung to the tune of the musical accompaniment will point up and illustrate any desired subject. An effective manner of accomplishing this is by incorporating the musical tune or story in a toy or the like having the general form of or depicting a story book animal or figure and, wherein the musical accompaniment suggests the story.

Although the present invention is directed primarily to toys intended for the amusement and instruction of children, it may very well be used by adults for similar purposes.

It is therefore, the general objective of this invention to provide an animatable device, the action of which is co-ordinated with a musical selection so associated with the animation as to heighten interest in the device while providing instruction as to a nursery rhyme or tune.

It is a more particular object of the invention to provide a musical toy or the like, of new and improved construction, depicting a scene or object associated with a musical rendition of such character that the music is suggestive of the action which the mechanism producing the music is designed to produce.

In the preferred mode of carrying out the above objectives it is an object of the invention to provide a new and improved toy in the general form of a violin or guitar associated with the nursery rhyme "Hi Diddle Diddle, the Cat and the Fiddle".

Another object of the invention is to provide a novel animatable musical toy incorporating improved means for actuating the animatable features in conjunction with the musical actuation of the new device.

Other objects and advantages of the invention will appear and be brought out more fully in the following specification, reference being had to the accompanying drawings.

In the drawings:

FIGURE 1 is a top plan view of an animatable musical toy embodying a preferred form of the invention.

FIGURE 2 is a partial view, partly broken away, of the same.

FIGURE 3 is a sectional view enlarged, taken on line 3—3 of FIGURE 2.

FIGURE 4 is a sectional view taken on line 4—4 of FIGURE 2.

FIGURE 5 is a sectional view taken on line 5—5 of FIGURE 3.

Referring more particularly to the drawing, there is shown a musical toy in the general form and configuration of a violin or guitar, preferably constructed of a thermoplastic material or the equivalent, comprising a frame or body 10 of hollow construction having a back or sounding board 11, a top or front wall 12 and a continuous side wall 13. A neck or stringboard 14 extends from one end of the frame or end portion of the wall 13 and suitably mounts several string-tuning pegs or pins 15 which secure one end of a plurality of strings 16 which extend over a bridge 17 on top wall 12, there being suitable formations 18 on the opposite end portion of wall 13 for securing the other ends of the strings.

A musical scale or comb 20 of any desired construction, such as having a cast zinc base 21, is mounted on the inner side of back 11 and provides bearings for a shaft 22 extending through sidewall 13 and having an external crank portion 23. A belt 24 of suitable material, such as rubber or plastic, is carried on shaft 22 and on a shaft 25 mounted on a bracket 26 which is secured on the inner side of back 11 in spaced relation to the comb 20. Belt 24 engages by means of protuberances 27 a plurality of spring wires 28 forming comb 20. The free ends of the wires 28 are positioned in pluckable relation to the protuberances 27 on the belt 24 for producing the musical tune during the actuation of the device. Belt 24 is also formed with a plurality of protuberances 29 disposed adjacent the edges of the belt and spaced therealong at suitable selected points, the spacing thereof being somewhat greater than that between the linear spacing of protuberances 27. Protuberances 29 are staggered along the belt in such manner that only one at a time will actuate the rotary shiftable plate 34, more fully described hereinafter.

Top or front 12 of the body 10 has a pair of apertures 30 and a somewhat elongated transverse aperture 31. A bracket 32 is suitably formed or provided on the underside of top 12 and has an upwardly extending pin 33. A plate 34 of suitable material, such as sheet metal, plastic or the like has a spiral slot 35 forming a spiral spring 36. This spring has a laterally projecting hub 37 at its center which is non-rotationally fitted on pin 33 of bracket 32. Plate 34 is also formed with a pair of laterally extending tongues or fingers 38 the ends of which are engageable with protuberances 29 on belt 24 during the actuation of the device.

On the upper side of plate 34 there is provided indicia 39 representing the eyes of an animal figure, such as a cat, and the plate 34 is also formed with an extention 40 which is disposed opposite aperture 31 and may represent the tongue of the animal. The construction of plate 34 and spring 36 are such that the plate is normally retained in the mid position so that indicia tongue 40 is approximately centered opposite elongated aperture 31 and the eyes 39 are substantially centered with respect to apertures 30.

Upon actuation of the belt 24 by crank 23 the protuberances 29 will successively engage the ends of tongues or fingers 38 and thereby rock or rotate the plate 34 which will shift so that the eye indicia 39 will move from side to side and tongue 40 will likewise be moved in a sidewise manner. At the same time the protuberances 27 will pluck the wires 28 and the tune which has been prearranged on the belt will be played. Such a tune may be "Hi Diddle Diddle, the Cat and the Fiddle".

From the foregoing description it will be clear that the animatable musical toy or guitar at its present embodiment fulfills all the objects set forth hereinabove. However, it will be understood that changes and modifications may be made in the structure, shape and form as well as the selection of the musical numbers incorporated on the belt 24. Such changes and modifications are contemplated within the scope and spirit of the subjoined claims. For example other musical tunes or nursery rhymes may be set up on the belt and other animal or object figures or representations may be formulated in or on top of front wall 13.

What is claimed is:

1. In an animatable toy musical instrument having frame means, musical means mounted on the frame means, said musical means including scale means and movable plucking means engageable with said scale means, said musical means also including means for moving said plucking means into plucking engagement with said scale means, said plucking means extending from said musical means and being spaced to engage said scale means in such sequence as to pluck a predetermined tune in a predetermined sequence, the improvement comprising: animatable display means swingably mounted on said frame in an initial position, display engaging means connected to said means for moving said plucking means, said display engaging means cyclically engaging said display means when said means for moving said plucking means is actuated, whereby said display means is rotated reciprocally about an axis in said frame, resilient mounting means for said display means for returning said display means to its initial position after it has been rotated away from said initial position.

2. An apparatus as defined in claim 1, wherein said frame means is in the form of a stringed instrument, and is provided with an apertured body portion through which the animatable display means may be observed.

3. In a toy musical instrument having a body portion, musical means mounted in said body portion for producing musical tones, and movable means mounted in said body portion, said movable means having protuberances formed thereon in a predetermined pattern, said protuberances extending into engagement with said musical means in such sequence and at such times as to produce a desired tune when said movable means is actuated, the combination comprising:

animatable display means swingably mounted in said body portion, said display means including means for normally maintaining it in a predetermined position, said movable means cyclically engaging said display means to swing it away from said predetermined position when said movable means is actuated to produce said desired tune, whereby said display means rotates reciprocally within said body portion during production of said desired tune.

4. In a toy musical instrument having a body portion, musical means mounted in said body portion for producing musical tones, and movable means mounted in said body portion, said movable means having protuberances formed thereon in a predetermined pattern, said protuberances extending into engagement with said musical means in such sequence and at such times as to produce a desired tune when said movable means is actuated, the combination comprising:

animatable display means swingably mounted in said body portion;

first display engagement means mounted on said movable means for engaging said display means for swinging it in a counter-clockwise direction cyclically when said movable means is actuated to produce said desired tunes;

second display engaging means mounted on said movable means for engaging said display means to swing it in a clockwise direction alternately with said counter-clockwise swinging, whereby said display means is oscillated within said body portion during production of said desired tune.

5. The combination of claim 4 including resilient means connected to said display means for normally maintaining it in a predetermined position.

6. The combination of claim 4 wherein said display means is swingably mounted in said body portion by a spiral spring forming an integral part of said display means and having a laterally projecting hub which is non-rotationally secured to a pin on said body portion.

7. The combination of claim 4 wherein said movable means comprises an endless belt, said first display engaging means comprises a first row of protuberances mounted on one marginal edge of said belt and said second display engaging means comprises a second row of protuberances mounted on the other marginal edge of said belt.

8. A toy musical instrument comprising:
a body portion having a back wall, a front wall and an encompassing side wall;
musical comb means mounted on said back wall;
endless belt means mounted on said back wall adjacent said comb means, said belt means having first and second marginal edge portions and an intermediate portion;
first protuberance means mounted on said intermediate portion of said belt means in a predetermined sequence, said first protuberance means being engageable with said comb means to play a tune thereon when said belt means is rotated within said body portion, said tune being determined by said predetermined sequence;
an animatable figure mounted on said front wall superjacent said endless belt means, said figure being swingable in a clockwise direction and a counter-clockwise direction;
second protuberance means mounted on said first marginal edge of said endless belt means, said second protuberance means being engageable with said figure to swing it in said clockwise direction when said belt means is rotated within said housing;
third protuberance means mounted on said second marginal edge of said belt means, said third protuberance means being engageable with said figure alternately with said second protuberance means to swing it in said counter-clockwise direction when said belt means is rotated within said housing, whereby said figure will oscillate within said housing during the playing of said tune by rotation of said belt means; and
aperture means provided in said front wall superjacent said figure, whereby the oscillation of said figure is visible exteriorly of said body portion.

9. The toy musical instrument of claim 8 including a string board extending from said body portion and a plurality of strings connected to said body portion and to said string board, said strings extending across said front wall superjacent said aperture means.

10. The toy musical instrument of claim 9 including a spiral spring connecting said figure to said front wall.

11. The toy musical instrument of claim 10 wherein said aperture means includes a first portion simulating the mouth of said figure and second and third portions simulaing the eye sockets of said figure and wherein said figure is provided with first indicia representing the eyes of said figure, said first indicia being mounted subjacent said simulated eye sockets, and second indicia representing the tongue of said figure, said second indicia being mounted subjacent said simulated mouth, said spring normally maintaining said tongue indicia in the approximate center of said simulated mouth and said eye indicia substantially centered with respect to said eye sockets, said eye indicia and said tongue indicia being moved from side to side with respect to their associated aperture means when said belt means is rotated within said body portion.

References Cited in the file of this patent

UNITED STATES PATENTS

| | | |
|---|---|---|
| 2,647,427 | Duncan | Aug. 4, 1953 |
| 2,705,387 | Handler et al. | Apr. 5, 1955 |